(12) United States Patent
Hofmann et al.

(10) Patent No.: US 8,486,367 B2
(45) Date of Patent: Jul. 16, 2013

(54) METHOD AND DEVICE FOR GENERATING HYDROGEN

(75) Inventors: Karl Heinz Hofmann, Germering (DE); Nicole Schoedel, Munich (DE); Klaus Klapper, Pullach (DE); Axel Behrens, Munich (DE); Roland Dittmeyer, Oberursel (DE)

(73) Assignee: Linde AG, Munich (DE)

( * ) Notice: Subject to any disclaimer, the term of this patent is extended or adjusted under 35 U.S.C. 154(b) by 265 days.

(21) Appl. No.: 13/001,849

(22) PCT Filed: Jun. 9, 2009

(86) PCT No.: PCT/EP2009/004189
§ 371 (c)(1),
(2), (4) Date: Apr. 1, 2011

(87) PCT Pub. No.: WO2010/000375
PCT Pub. Date: Jan. 7, 2010

(65) Prior Publication Data
US 2011/0171118 A1 Jul. 14, 2011

(30) Foreign Application Priority Data
Jul. 1, 2008 (DE) .......................... 10 2008 031 092

(51) Int. Cl.
*C01B 3/24* (2006.01)
*B01J 7/00* (2006.01)
*C01B 3/26* (2006.01)

(52) U.S. Cl.
USPC .............. 423/650; 48/61; 48/197 R; 422/239; 423/651; 423/652

(58) Field of Classification Search
USPC ............ 423/650–654; 48/61, 197 R; 422/239
See application file for complete search history.

(56) References Cited

U.S. PATENT DOCUMENTS 3,278,268 A * 10/1966 Pfefferle, Jr. ................. 423/654
3,450,500 A * 6/1969 Eggen et al. .................. 423/653

(Continued)

FOREIGN PATENT DOCUMENTS

WO 2007031713 A1 3/2007
WO 2007111278 A1 10/2007

OTHER PUBLICATIONS

World IP Organization. "International Search Report." PCT/EP2009/004189, Applicant: IFP, Mailed: Sep. 17, 2009.

(Continued)

*Primary Examiner* — Wayne Langel
(74) *Attorney, Agent, or Firm* — Millen, White, Zelano & Branigan, P.C.

(57) ABSTRACT

The invention relates to a method and a device for generating hydrogen (5), wherein an input (1) comprising carbon is fed longitudinally through a tube-shaped reaction chamber (Z), together with water steam (2), and is thereby converted by steam reforming, and hydrogen (4) formed during steam reforming is continuously drawn off out of the reaction chamber (Z) through a separating wall (T), said wall being selectively hydrogen-permeable at least in segments, and at a pressure less than the pressure in the reaction chamber (Z) and greater than the ambient pressure, having greater purity than product (5), characterized in that a separating wall (T) is used, the selectively hydrogen-permeability segments thereof being disposed such that a hydrogen partial pressure drop exists over the entire surface of each of such segments between the reaction chamber side and the hydrogen extraction side (W).

19 Claims, 2 Drawing Sheets

U.S. PATENT DOCUMENTS

Figure 1:
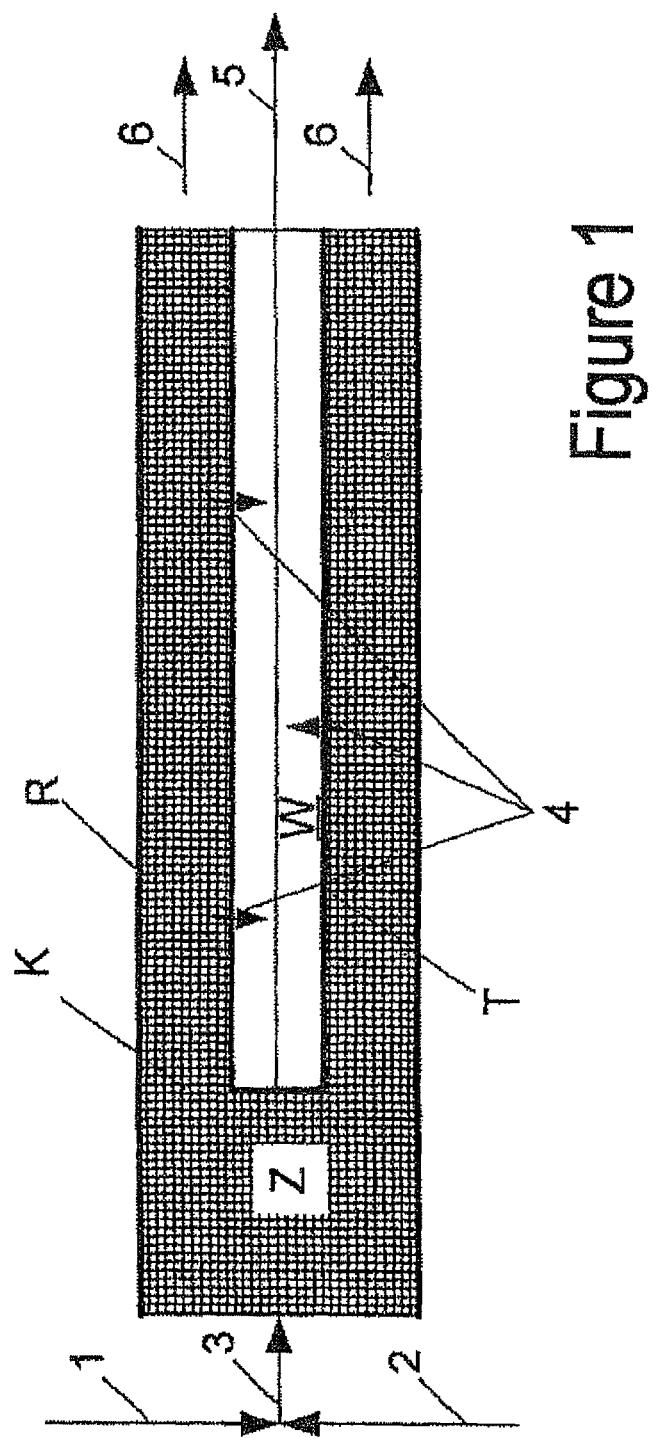

| | | | |
|---|---|---|---|
| 4,713,234 A * | 12/1987 | Weirich et al. | 423/648.1 |
| 6,207,132 B1 * | 3/2001 | Lin et al. | 423/648.1 |
| 7,938,893 B2 * | 5/2011 | Doong et al. | 96/7 |
| 2002/0094310 A1 * | 7/2002 | Krause et al. | 422/191 |
| 2008/0019902 A1 * | 1/2008 | Rei et al. | 423/652 |
| 2009/0180949 A1 * | 7/2009 | Cui et al. | 423/651 |
| 2010/0086478 A1 * | 4/2010 | Edlund | 423/650 |

OTHER PUBLICATIONS

World IP Organization. "Written Opinion." PCT/EP2009/004189, Applicant: IFP, Mailed: Sep. 17, 2009.

* cited by examiner

METHOD AND DEVICE FOR GENERATING HYDROGEN

The invention relates to a method for generating hydrogen, wherein a carbonaceous feed is conducted longitudinally through a tubular reaction chamber together with steam and is converted in the course of this by steam reformation, and hydrogen formed in the steam reformation is taken off from the reaction chamber continuously via a partition which is selectively hydrogen-permeable at least in sections and is obtained as product having a high purity and at a pressure which is lower than the pressure in the reaction chamber and is higher than the ambient pressure.

In addition, the invention relates to a device for carrying out the method.

Steam reformation is a process known for many years in which, primarily short-chain hydrocarbons, such as, for example, methane ($CH_4$) or naphtha, together with steam are converted to carbon oxides and hydrogen in a reaction chamber with catalytic support. The temperatures in the reaction chamber are typically between 800 and 950° C., whereas the pressure is 20 to 40 bar. During the steam reformation, substantially, a reformation reaction and a shift reaction proceed according to the following reaction equations:

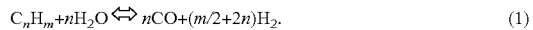
$$C_nH_m + nH_2O \Leftrightarrow nCO + (m/2 + 2n)H_2. \quad (1)$$

$$CO + H_2O \Leftrightarrow CO_2 + H_2O \quad (2)$$

Usually, the reaction chamber is arranged in a heatable reactor tube to which the energy required for the overall highly endothermic reformation process is supplied from the outside. At one end, the starting materials (carbonaceous feed and steam) are introduced into the reactor tube, whereas at the other end a hydrogen-containing product gas is taken off which comprises a considerable portion of unreacted, or incompletely reacted, starting materials. In the case of methane this means, for example, that approximately 20-40% of the starting material methane is present in the product gas. Customarily, a further process step therefore follows a steam reformation, in which further process step unreacted methane is converted into hydrogen and carbon monoxide down to residual contents of less than 1% by reformation or partial oxidation. If obtaining a hydrogen product is the actual purpose of the method, the reformation steps are followed by a water gas shift in which carbon monoxide is converted with water to hydrogen and carbon dioxide. The product hydrogen must then be separated off from the gas mixture generated in the water gas shift by complex process steps.

In order to overcome the disadvantages of this prior art, the patent application EP 0167101 specifies a method and also a device with which it is possible to convert the carbonaceous feed more effectively by steam reformation and to obtain product hydrogen at a higher yield and in fewer process steps. In the case of the described method, hydrogen formed in the steam 30, reformation is continuously taken off from the reaction chamber into a hydrogen takeoff chamber via a selectively hydrogen-permeable partition and passed on further at high purity. Taking off the hydrogen from the reaction chamber is connected with an equilibrium shift towards the product side in the reactions (1) and (2) proceeding in the steam reformation. This causes a higher hydrogen yield with simultaneous reduction of carbon monoxide formation. EP 0167101 specifies a reactor tube for carrying out the method described in which the selectively hydrogen-permeable partition is arranged in the reaction chamber in the form of a tube or a multiplicity of tubes, wherein the length of the tube or the tubes extends over the entire length of the reaction chamber. The interior of the tube or tubes forms the hydrogen takeoff chamber.

The motive force for taking off the hydrogen from the reaction chamber is the hydrogen partial pressure difference prevailing between reaction chamber and hydrogen takeoff chamber. Whereas the hydrogen partial pressure in the reaction chamber increases from the inlet side of the starting materials beginning from zero, it is substantially constant in the entire hydrogen takeoff chamber. In the regions of the reactor tube in which the hydrogen partial pressure in the reaction chamber is lower than in the hydrogen takeoff chamber, some of the hydrogen taken off at another point diffuses back into the reaction chamber. This effect, termed back diffusion, leads to an impairment of the hydrogen yield.

In order to be able to take off hydrogen from the reaction chamber without back diffusion, according to the prior art the partition is flushed with a gas (e.g. steam or nitrogen) on sides of the hydrogen takeoff chamber, or the hydrogen is taken off at reduced pressure. Both methods are associated with disadvantages, since in the first case the hydrogen is contaminated by the flushing gases, and in the second case the hydrogen must be compressed to the desired product pressure which is generally significantly above the ambient pressure.

The object of the present invention is therefore to propose a method of the type mentioned above, and a device to carry out said method, through which method and device the disadvantages of the prior art may be overcome.

The object in question is achieved according to the invention in terms of the method in that a partition is used, selectively hydrogen-permeable sections of which are arranged in such a manner that a hydrogen partial pressure drop exists in each case over the entire surface of such a section between the reaction chamber side and the hydrogen takeoff side.

By taking off the hydrogen from the reaction chamber and the associated shift of the reaction equilibria, the steam reformation can be carried out at comparatively low temperatures (450-800° C.). In order to prevent the selectively hydrogen-permeable sections used in the partition, which preferably consist of palladium or a palladium alloy such as, for example, a palladium-gold alloy or a palladium-silver alloy, from being damaged, it is proposed that when the method according to the invention is being carried out the hydrogen-permeable partition is operated at temperatures between 450 and 700° C.

Preferred embodiments of the method according to the invention envisage that the steam reformation is carried out at a pressure between 5 and 50 bar(a), preferably between 10 and 30 bar(a), wherein the product hydrogen is obtained at a pressure between 1 and 10 bar(a), but preferably between 1.5 and 5 bar(a).

The method according to the invention is suitable for converting all possible hydrocarbons which are also already converted by steam reformation by the prior art, wherein the amount of steam required to suppress soot formation, however, can be considerably reduced. In particular, it is also suitable for converting methane. Preferred embodiments of the method according to the invention therefore envisage that a mixture of matter is fed to the reaction chamber, which mixture of matter comprises steam and methane in a ratio which is between 2 and 4, preferably between 3 and 4.

In addition, the invention relates to a device for generating hydrogen comprising a reaction chamber enclosed by a tube, in which reaction chamber a mixture of matter consisting of steam and a carbonaceous feed can be converted by steam reformation, and also a partition that is selectively hydrogen permeable at least in sections, via which the hydrogen generated in the steam reformation can be taken off with high purity from the reaction chamber at a pressure which is lower than the pressure in the reaction chamber and higher than the ambient pressure.

The object in question is achieved according to the invention in terms of the device in that the selectively hydrogen-permeable sections of the partition are arranged in such a manner that a hydrogen partial pressure drop exists in each case over the entire surface of such a section between the reaction chamber and the hydrogen takeoff side.

In a preferred embodiment of the device according to the invention, the partition is constructed as a tube (separating tube), wherein the tube exterior faces the reaction chamber. The separating tube interior forms a chamber (hydrogen takeoff chamber) via which the hydrogen taken off from the reactor chamber can be conducted out of the reaction tube. Another preferred embodiment of the device according to the invention envisages that the partition consists of a multiplicity of separating tubes which are preferably bundled to form a module (separating module), wherein the separating tubes are constructed identically or differently. A separating tube or a separating module is preferably arranged centrally in the reaction tube.

In a development of the invention, it is proposed that a separating tube or a separating module is constructed so as to be hydrogen-impermeable in the starting material-side region of the reactor tube in which the hydrogen partial pressure in the reaction chamber is lower than in the hydrogen takeoff chamber or that a separating tube or a separating module first starts at a position of the reaction chamber at which the hydrogen partial pressure in the reaction chamber is higher than in the hydrogen takeoff chamber.

The selectively hydrogen-permeable sections of the partition can be implemented with a multiplicity of homogeneous or porous materials which allow hydrogen to pass through sufficiently well at the temperatures necessary for steam reformation. These requirements are met outstandingly by membranes made of palladium and palladium alloys such as, e.g., palladium-gold or palladium-silver alloys. Particularly preferred variants of the device according to the invention therefore envisage that the selectively hydrogen-permeable sections of the partition have a membrane which preferably consists of palladium or a palladium-gold alloy or a palladium-silver alloy.

Since selectively hydrogen-permeable membranes suitable for use in the device according to the invention are very expensive and therefore give rise to a majority of the capital costs, it is expedient to minimize the total surface area of the selectively hydrogen-permeable sections of the hydrogen generation, for example with respect to the highest possible economic efficiency. The conditions expedient for hydrogen separation (e.g. the hydrogen partial pressure) vary over the length, but also over the radius of the reaction chamber, for which reason it can be expedient to construct a separating module from separating tubes of different lengths, wherein, for example, separating tubes are arranged in a smaller number and with greater lengths further inwards than further outwards. Such a structure of a separating module means that expensive membrane surface area is only arranged where the greatest effect can be achieved.

The selectively hydrogen-permeable membranes possess only a low mechanical stability. In order that the membranes can resist in the long term the stresses occurring in operation, the invention envisages that they lie on a sufficiently resistant, hydrogen-permeable support structure which preferably consists of a sintered metal.

In order to prevent the diffusion of metal ions out of the support structure into the hydrogen-permeable membrane, an oxidic intermediate layer is arranged between the support structure and the hydrogen-permeable membrane, which oxidic intermediate layer acts as a diffusion barrier to metal ions.

The invention makes it possible to take off high-purity hydrogen from the reactor tube having CO contents of less than 1% and having a pressure significantly above ambient pressure. Subsequent treatment steps, such as secondary reforming and water gas shift, are therefore not necessary. In addition, hydrogen separation steps and/or a hydrogen compression can be dispensed with. By avoiding expensive hydrogen-permeable membranes in regions of the reaction chamber in which back diffusion of hydrogen occurs, lower capital costs result.

Hereinafter the invention will be described in more detail with reference to two exemplary embodiments shown diagrammatically in FIGS. 1 and 2.

FIG. 1 shows a reactor tube R, at the one end of which a mixture of matter 3 consisting of a carbonaceous feed 1 and steam 2 is introduced into the reaction chamber Z that is filled with a catalyst bed K suitable for carrying out a steam reformation. The hydrogen production starts with the entry of the hydrogen-free mixture of matter 3 into the catalyst bed K—at a pressure of, e.g., 16 bar and a temperature of approximately 550° C., whereby the hydrogen partial pressure increases in the direction of flow. At the upstream end of the partition T which is constructed as a tube and arranged centrally in the reactor tube, R, the hydrogen partial pressure in the reaction chamber Z has increased to a value which is higher than the hydrogen partial pressure in the hydrogen takeoff chamber W (e.g. 2 bar): up to the end of the catalyst bed K, a hydrogen partial pressure drop is maintained in such a manner that hydrogen 4 diffuses from the reaction chamber Z into the hydrogen takeoff chamber W via which it is finally taken off from the reactor tube R as hydrogen product 5. Back diffusion of hydrogen from the hydrogen takeoff chamber W into the reaction chamber Z is effectively avoided. At the end of the reactor tube R, a hydrogen- and carbon monoxide-containing residual gas 6 is removed from the reactor tube R, which residual gas can be used as fuel gas for heating the reactor tube R.

Figure 2:
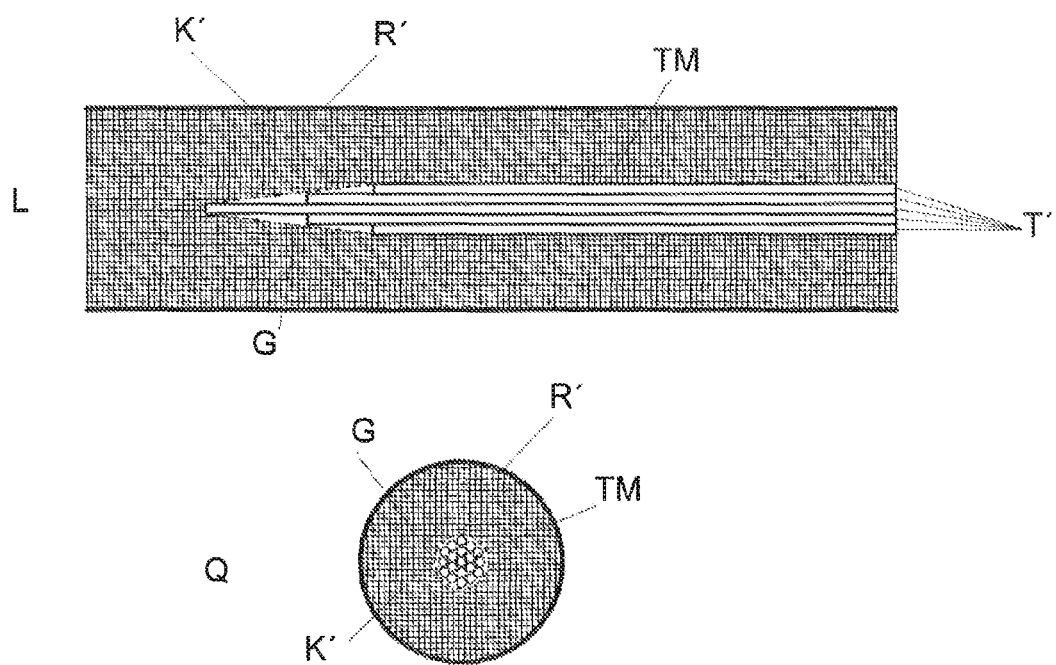

FIG. 2 shows a longitudinal section L and a cross section Q through a reactor tube R' in which separation module TM formed of a plurality of separating tubes T' is arranged. The number of the separating tubes T' arranged about a periphery grows with the distance from the axis of the reactor tube R', whereas their length decreases. By means of this type of separating tube arrangement, the area of the selectively hydrogen-permeable membrane can be readily adapted to the conditions occurring in the reactor tube R'. Although the separating module TM, owing to its shape, already has a high mechanical stability, it is additionally enclosed by a grating G by means of which direct contact of the selectively hydrogen-permeable membrane with the catalyst bed K' is substantially avoided. Depending on the parameters and boundary conditions of the steam reformation, other arrangements of the separating tubes' can also be expedient.

The invention claimed is:

1. A device for generating hydrogen comprising:
 a reaction chamber enclosed by a tube, in which reaction chamber a mixture comprising steam and a carbonaceous feed can be converted by steam reforming, and
 a partition that is selectively hydrogen permeable at least in sections, positioned within said reaction chamber, via which the hydrogen generated in the steam reforming can be taken off with high purity from the reaction chamber at a pressure which is lower than the pressure in the reaction chamber and higher than the ambient pressure, wherein the selectively hydrogen-permeable sections of the partition are arranged in such a manner that a hydrogen partial pressure drop exists in each case over the entire surface of such a section between the reaction chamber and the hydrogen takeoff side, wherein said partition comprises a multiplicity of separating tubes of different lengths which are bundled to form a module.

2. The device according to claim 1, wherein said module is arranged centrally within said tube enclosing said reaction chamber.

3. The device according to claim 1, wherein said selectively hydrogen-permeable sections are membranes.

4. The device according to claim 1, wherein the selectively hydrogen-permeable sections of the partition have a membrane made of palladium or made of a palladium-gold alloy or palladium-silver alloy.

5. The device according to claim 3, wherein said membranes are each supported by a hydrogen-permeable support structure made of a sintered metal.

6. The device according to claim 3, wherein an oxidic intermediate layer is arranged between the hydrogen-permeable support structure and the membrane.

7. The device according to claim 1, wherein said separating tubes are arranged such that tubes greater lengths are positioned further inwards in said module.

8. The device according to claim 1, wherein said reaction chamber contains a bed of steam reformation catalyst.

9. The device according to claim 1, wherein said module of separating tubes of different lengths is enclosed by a grating.

10. A method of producing hydrogen comprising conducting steam reforming in a device according to claim 1.

11. The method according to claim 10, wherein the hydrogen-permeable partition is operated at temperatures between 450 and 700° C.

12. The method according to claim 10, wherein steam reformation is carried out in said reaction chamber at a pressure between 5 and 50 bar(a).

13. The method according to claim 10, wherein steam reformation is carried out in said reaction chamber at a pressure between 10 and 30 bar(a).

14. The method according to claim 11, wherein steam reformation is carried out in said reaction chamber at a pressure between 5 and 50 bar(a).

15. The method according to claim 11, wherein steam reformation is carried out in said reaction chamber at a pressure between 10 and 30 bar(a).

16. The method according to claim 10, wherein product hydrogen is obtained at a pressure between 1 and 10 bar(a).

17. The method according to claim 10, wherein product hydrogen is obtained at a pressure between 1.50 and 5 bar(a).

18. The method according to claim 10, wherein a mixture of steam and methane are fed into the reaction chamber, wherein the ratio of steam and methane in said mixture is between 2 and 4.

19. The method according to claim 10, wherein a mixture of steam and methane are fed into the reaction chamber, wherein the ratio of steam and methane in said mixture is between 3 and 4.

* * * * *

UNITED STATES PATENT AND TRADEMARK OFFICE
CERTIFICATE OF CORRECTION

PATENT NO.         : 8,486,367 B2                                  Page 1 of 1
APPLICATION NO.    : 13/001849
DATED              : July 16, 2013
INVENTOR(S)        : Karl Heinz Hofmann et al.

It is certified that error appears in the above-identified patent and that said Letters Patent is hereby corrected as shown below:

Title Page, reads: "(22) PCT Filed: June 9, 2009" should read: --(22) PCT Filed: June 10, 2009--

Signed and Sealed this
Twenty-fourth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,486,367 B2  Page 1 of 1
APPLICATION NO. : 13/001849
DATED : July 16, 2013
INVENTOR(S) : Hofmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this
Eighth Day of September, 2015

Michelle K. Lee
*Director of the United States Patent and Trademark Office*